(12) United States Patent
Karp et al.

(10) Patent No.: US 12,353,933 B2
(45) Date of Patent: Jul. 8, 2025

(54) COLOR QR-CODE ENABLED ENERGY DISTRIBUTING COASTER AND LABEL ASSEMBLY

(71) Applicant: Rainwater Energy Technologies LLC, Hollywood, FL (US)

(72) Inventors: Drew Karp, Aventura, FL (US); Peri Basel, Aventura, FL (US)

(73) Assignee: Rainwater Energy Technologies, LLC, Hollywood, FL (US)

( * ) Notice: Subject to any disclaimer, the term of this patent is extended or adjusted under 35 U.S.C. 154(b) by 0 days.

(21) Appl. No.: 18/587,451

(22) Filed: Feb. 26, 2024

(65) Prior Publication Data

US 2024/0249099 A1 Jul. 25, 2024

Related U.S. Application Data

(63) Continuation of application No. PCT/US2022/041737, filed on Aug. 26, 2022.

(60) Provisional application No. 63/237,323, filed on Aug. 26, 2021.

(51) Int. Cl.
*G06K 19/06* (2006.01)

(52) U.S. Cl.
CPC ............... *G06K 19/06037* (2013.01)

(58) Field of Classification Search
CPC .. G06K 19/06037; G06K 19/00; G06K 19/06; G06K 7/1417
USPC ............. 235/494, 487, 462.09, 462.1, 375
See application file for complete search history.

(56) References Cited

U.S. PATENT DOCUMENTS

| | | | | |
|---|---|---|---|---|
| 2011/0050431 | A1* | 3/2011 | Hood | G01N 33/14 |
| | | | | 340/603 |
| 2015/0095168 | A1* | 4/2015 | Zises | G06Q 50/12 |
| | | | | 705/15 |
| 2016/0364714 | A1* | 12/2016 | Hodges | G06Q 30/0623 |
| 2020/0145826 | A1* | 5/2020 | Katz | G06K 7/1417 |
| 2020/0281380 | A1* | 9/2020 | Nishida | A47G 19/2255 |

FOREIGN PATENT DOCUMENTS

| | | | |
|---|---|---|---|
| JP | 2015221188 A | * | 12/2015 |
| JP | 2019052133 A | * | 4/2019 |
| JP | 2021093028 A | * | 6/2021 |
| JP | 2021185907 A | * | 12/2021 |

* cited by examiner

*Primary Examiner* — Edwyn Labaze
(74) *Attorney, Agent, or Firm* — Mark C. Johnson; Johnson Dalal

(57) ABSTRACT

A color surrounding a QR-code enabled energy distributing assembly in the form of a coaster or label is operably configured to enhance the flavor profile of a liquid beverage housed within a beverage container, through the process of quantum tunneling. The color and QR code has an optimal frequency of 612 THz encoded therein, corresponding to the blue-green hue. The coaster body has an upper surface, a lower surface opposing the upper surface, a sidewall separating the upper surface and the lower surface, and the color and QR code disposed on the coaster body, the color and QR code having a frequency of 612 THz encoded therein, corresponding to the blue-green hue. The label body has an upper surface, a lower surface opposing the upper surface, and the color and QR code disposed on the label body.

13 Claims, 21 Drawing Sheets

Table 1 - Whiskey

Coaster – 24 hrs

| Fusel Oil component | Sample 1 | Sample 2 | Sample 3 | Mean | SD |
|---|---|---|---|---|---|
| Ethyl Acetate | 22.22 | 20.92 | 22.63 | 21.92 | 0.89 |
| Methanol | 12.14 | 9.95 | 12.66 | 11.58* | 1.44 |
| n-Propanol | 192.18 | 188.86 | 193.81 | 191.62^ | 2.52 |
| Iso-Butanol | 253.79 | 248.97 | 256.55 | 253.1^ | 3.84 |
| n-butanol | 1.15 | 1.11 | 1.41 | 1.22 | 0.16 |
| Active Amyl Alcohol | 295.01 | 293.61 | 298.79 | 295.14* | 3.59 |
| Total Fusel Oil | 776.5 | 763.41 | 785.85 | 774.59*** | 12.33 |

No Coaster - 24 hrs

| Fusel Oil component | Sample 1 | Sample 2 | Sample 3 | Mean | SD |
|---|---|---|---|---|---|
| Ethyl Acetate | 23.01 | 23.31 | 23.82 | 23.38 | 0.41 |
| Methanol | 15.09 | 14.33 | 14.43 | 14.62* | 0.41 |
| n-Propanol | 196.56 | 195.75 | 198.77 | 197.02^ | 1.56 |
| Iso-Butanol | 261.37 | 261.04 | 264.36 | 262.26^ | 1.83 |
| n-butanol | 1.31 | 1.19 | 1.23 | 1.24 | 0.06 |
| Active Amyl Alcohol | 303.98 | 304.94 | 307.76 | 305.56* | 1.96 |
| Total Fusel Oil | 801.32 | 800.56 | 810.36 | 804.08*** | 5.45 |

Students unpaired, two-tailed t test:
*p=0.0248, 'p=0.2343
^p=0.0197,^p=0.0116
**p=0.019

FIG. 19

Table 2 - Tequila

Coaster – 24 hrs

| Fusel Oil component | Sample 1 | Sample 2 | Sample 3 | Mean | SD |
|---|---|---|---|---|---|
| Ethyl Acetate | 20.66 | 20.17 | 19.94 | 20.26 | 0.37 |
| Methanol | 765.48 | 751.18 | 763.64 | 760.10 | 7.78 |
| n-Propanol | 268.47 | 262.59 | 270.76 | 267.27 | 4.21 |
| iso-Butanol | 202.91 | 198.21 | 203.93 | 201.68 | 3.05 |
| n-butanol | 7.87 | 6.82 | 7.50 | 7.40 | 0.53 |
| Active Amyl Alcohol | 520.47 | 509.55 | 524.92 | 518.31 | 7.91 |
| Total Fusel Oil | 1,785.85 | 1,748.52 | 1,790.69 | 1,775.02 | 23.07 |

No Coaster – 24 hrs

| Fusel Oil component | Sample 1 | Sample 2 | Sample 3 | Mean | SD |
|---|---|---|---|---|---|
| Ethyl Acetate | 20.69 | 20.81 | 19.51 | 20.34 | 0.41 |
| Methanol | 770.53 | 779.72 | 761.99 | 770.75 | 0.41 |
| n-Propanol | 268.94 | 272.69 | 268.24 | 269.96 | 1.56 |
| iso-Butanol | 205.46 | 206.47 | 201.74 | 204.56 | 1.83 |
| n-butanol | 7.70 | 7.75 | 6.93 | 7.46 | 0.06 |
| Active Amyl Alcohol | 524.28 | 530.32 | 520.56 | 525.05 | 1.98 |
| Total Fusel Oil | 1,797.60 | 1,817.76 | 1,778.97 | 1,798.11 | 19.40 |

FIG. 20

Table 3 - Whiskey

Coaster – 5 min

| Fusel Oil component | Sample 1 | Sample 2 | Sample 3 | Mean | SD |
|---|---|---|---|---|---|
| Ethyl Acetate | 118.37 | 119.3 | 122.84 | 120.17 | 20.26 |
| Methanol | 33.5 | 35.23 | 36.88 | 35.2 | 760.10 |
| n-Propanol | 205.71 | 206.88 | 211.76 | 208.12 | 267.27 |
| iso-Butanol | 274.07 | 277.28 | 283.98 | 278.44 | 201.68 |
| n-butanol | 1.77 | 1.85 | 2.1 | 1.9 | 7.40 |
| Active Amyl Alcohol | 317.37 | 321.5 | 328.48 | 322.46 | 518.31 |
| Total Fusel Oil | 950.8 | 962.06 | 986.03 | 966.29 | 17.99 |

No Coaster - 5 min

| Fusel Oil component | Sample 1 | Sample 2 | Sample 3 | Mean | SD |
|---|---|---|---|---|---|
| Ethyl Acetate | 119.45 | 123.62 | 125.92 | 123.00 | 3.28 |
| Methanol | 35.08 | 32.28 | 36.85 | 34.74 | 2.30 |
| n-Propanol | 204.68 | 214.04 | 213.57 | 210.76 | 5.27 |
| iso-Butanol | 273.07 | 287.2 | 286.05 | 282.11 | 7.858 |
| n-butanol | 1.91 | 2.08 | 2.15 | 2.05 | 0.12 |
| Active Amyl Alcohol | 316.51 | 335.6 | 332.63 | 328.24 | 10.27 |
| Total Fusel Oil | 950.7 | 994.82 | 997.16 | 980.89 | 26.17 |

FIG. 21

Table 4 - Tequila

Coaster – 5 min

| Fusel Oil component | Sample 1 | Sample 2 | Sample 3 | Mean | SD |
|---|---|---|---|---|---|
| Ethyl Acetate | 108.53 | 109.51 | 112.48 | 110.17 | 2.06 |
| Methanol | 817.75 | 833.58 | 842.71 | 831.35 | 12.63 |
| n-Propanol | 285.96 | 289.64 | 295.41 | 290.34 | 4.76 |
| iso-Butanol | 217.65 | 220.33 | 224.94 | 220.97 | 3.69 |
| n-butanol | 8.53 | 8.36 | 8.12 | 8.34 | 0.21 |
| Active Amyl Alcohol | 556.01 | 565.76 | 576.6 | 566.12 | 10.30 |
| Total Fusel Oil | 1994.43 | 2027.18 | 2060.26 | 2027.29 | 32.92 |

No Coaster-5 min

| Fusel Oil component | Sample 1 | Sample 2 | Sample 3 | Mean | SD |
|---|---|---|---|---|---|
| Ethyl Acetate | 115.83 | 116.01 | 112.97 | 114.94 | 1.71 |
| Methanol | 839.39 | 835.86 | 835.33 | 836.86 | 2.21 |
| n-Propanol | 292.81 | 289.56 | 290.83 | 291.07 | 1.64 |
| iso-Butanol | 223.37 | 220.15 | 221.52 | 221.68 | 1.62 |
| n-butanol | 8.32 | 8.81 | 8.97 | 8.70 | 0.34 |
| Active Amyl Alcohol | 570.91 | 566.40 | 570.13 | 569.15 | 2.41 |
| Total Fusel Oil | 2050.61 | 2036.78 | 2039.76 | 2042.383 | 7.278642 |

FIG. 22

COLOR QR-CODE ENABLED ENERGY DISTRIBUTING COASTER AND LABEL ASSEMBLY

FIELD OF THE INVENTION

The present invention relates generally to structures configured to emit a frequency and, more particularly, relates to a color surrounding a QR-code enabled energy distributing assembly in the form of a coaster or label.

BACKGROUND OF THE INVENTION

Quantum tunneling or tunneling is a quantum mechanical phenomenon where a wavefunction can propagate through a barrier. The transmission through the barrier can be finite and depends exponentially on the barrier height and barrier width. The wavefunction may disappear on one side and reappear on the other side. The wavefunction and its first derivative are continuous. In steady-state, the probability flux in the forward direction is spatially uniform. No particle or wave is lost. Tunneling conventionally occurs with barriers of thickness around 1-3 nm and smaller. The invention utilizes quantum tunnelling principles to transmit such wavelength energy as to vary the physical properties of liquids, through a user-friendly and effective structure, namely a beverage coaster or label.

The sensation of taste or flavor of beverages is a synthesis of multiple senses (e.g., taste, smell, texture) corresponding to the chemical makeup of what is imbibed. Component chemicals in beverages interact with taste receptors in taste buds in the mouth and olfactory receptors in the membranes of nasal passages and olfactory lobe of the brain. More volatile ingredients are better able to reach the olfactory receptors located on cilia in the nasal mucosa where they can result in stimulation of nerve cells that carry signals to the olfactory lobe of the brain. While individual compounds may elicit a distinctive flavor sensation, the flavor of mixtures of compounds is much more complex. Therefore, slight changes in certain components can alter the perceived flavor in unpredictable ways. Without being bound by any particular theory, there are multiple mechanisms by which this can occur due to selective effects of component compounds at various levels in the process of olfaction. For instance, components can interact with each other while in solution to alter physical chemical properties such as volatility in addition to interacting at the level of olfactory receptors, mucosal membrane partitioning and at higher levels of processing in the olfactory lobe and other brain centers. The entire process results in a non-linear relationship between the concentration of component chemicals and the magnitude and quality of the perceived sensations.

The more volatile a compound, the greater the chance that molecules of that compound will make its way through the nasal passages to the nasal mucosa and interact with olfactory receptors. For this reason, volatile molecules like fusel oils, tend to have more impact on the odor component of flavor than non-volatile compounds. Fusel oils are a class of compounds present in alcoholic beverages that are known to impact taste, flavor, and odor. Fusel oils are a group of alcohols other than ethanol that are by-products of fermentation that are formed during the production of alcoholic beverages such as beer and wine. Fusel oils can become further concentrated during the distillation of spirits and can affect the taste, odor and texture of whiskey, tequila, and other distilled spirits. A typical panel for screening fusel oil content will measure methanol, amyl alcohol, butanol, isobutanol, n-propanol, and ethyl acetate. For example, an abundant fusel oil, isoamyl alcohol, has a burning, biting taste. Therefore, changes in levels of fusel oils are relevant to the taste profile of an alcoholic beverage that are routinely monitored by vendors of alcoholic beverages.

The invention utilizes quantum tunneling principles to vary the physical properties of liquids, including fusel oil levels, through a user-friendly structure, namely a beverage coaster or label.

Therefore, a need exists to overcome the challenge with the prior art as discussed above.

SUMMARY OF THE INVENTION

The invention provides a color QR-code enabled energy distributing coaster and label assembly that overcomes the hereinbefore-mentioned disadvantages of the heretofore-known devices and methods of this general type and that initiates the tunneling wavelength process, effecting the chemical properties of the liquid and thereby enhancing the flavor and texture of liquid beverages placed in close proximity thereto in some individuals. The present invention is physically embodied in a coaster, whereupon a beverage container having a liquid beverage therein is placed on the coaster, or a label, whereupon the label is printed on or affixed to the beverage container having the liquid beverage therein.

With the foregoing and other objects in view, there is provided, in accordance with the invention, a color and QR-code enabled energy distributing assembly operably configured to initiate a tunneling wavelength process comprising a coaster body having an upper surface defining an upper surface area, a lower surface opposing the upper surface, a sidewall separating the upper surface and the lower surface, and a color and a QR code disposed on the upper surface of the coaster body, the color having a frequency of approximately 612 THz encoded therein.

In accordance with a feature of one embodiment of the present invention, the color is of a blue-green hue and has a wavelength of approximately 490 nanometers encoded therein that corresponds to the blue-green hue.

In accordance with another feature, the upper surface area is defined by an outer edge of the coaster body and the color is disposed on at least 75% of the upper surface area.

In accordance with a further feature of the present invention, the coaster body has dimensions of 4 inches by 4 inches.

In accordance with yet another feature, the QR code is embedded into a color, grayscale, or binary image on the coaster body and is partially formed with the color of the upper surface of the coaster body.

In accordance with another feature of the present invention, the color and QR-code enabled energy distributing assembly further comprises a liquid container housing a liquid beverage, wherein the color and QR code is disposed proximal to the liquid beverage.

In accordance with a feature of another embodiment of the present invention, there is provided a color and QR-code enabled energy distributing label assembly operably configured to initiate a tunneling wavelength process and comprising a handheld liquid container housing a liquid beverage; and a label body having an upper surface defining an upper surface area entirely and adhesively coupled to the handheld liquid container, a lower surface opposing the upper surface, and with a color disposed on the upper surface of the coaster body and disposed proximal to the liquid beverage, the color having a frequency of approximately 612 THz encoded therein.

In accordance with another feature, the color is of a blue-green hue and has a wavelength of approximately 490 nanometers encoded therein that corresponds to the blue-green hue.

In accordance with yet another feature of the present invention, the label body has dimensions of 4 inches by 4 inches.

In accordance with a further feature, the present invention further comprises a QR code disposed on the upper surfaces of the label body and is embedded into a color, grayscale, or binary image on the label body.

In accordance with another feature of the present invention, the color and QR code is disposed proximal to the liquid beverage.

In accordance with another embodiment of the present invention, there is provided, in combination with a beverage container having a liquid beverage therein, a color and QR-code enabled energy distributing assembly operably configured to initiate a tunneling wavelength process comprising, a body having an upper surface, a lower surface opposing the upper surface, and a color and QR code disposed on the body, the color and QR code having a frequency of 612 THz encoded therein, corresponding to the blue-green hue, and disposed proximal to the liquid beverage.

In accordance with a further feature of said embodiment, the QR code is embedded into a color, grayscale, or binary image on the body.

Although the invention is illustrated and described herein as embodied in a color QR-code enabled energy distributing coaster and label assembly, it is, nevertheless, not intended to be limited to the details shown because various modifications and structural changes may be made therein without departing from the spirit of the invention and within the scope and range of equivalents of the claims. Additionally, well-known elements of exemplary embodiments of the invention will not be described in detail or will be omitted so as not to obscure the relevant details of the invention. While the specification concludes with claims defining the features of the invention that are regarded as novel, it is believed that the invention will be better understood from a consideration of the following description in conjunction with the drawing figures, in which like reference numerals are carried forward. The figures of the drawings are not drawn to scale.

Before the present invention is disclosed and described, it is to be understood that the terminology used herein is for the purpose of describing particular embodiments only and is not intended to be limiting. The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically. The term "providing" is defined herein in its broadest sense, e.g., bringing/coming into physical existence, making available, and/or supplying to someone or something, in whole or in multiple parts at once or over a period of time. Also, for purposes of description herein, the terms "upper", "lower", "left," "rear," "right," "front," "vertical," "horizontal," and derivatives thereof relate to the invention as oriented in the figures and is not to be construed as limiting any feature to be a particular orientation, as said orientation may be changed based on the user's perspective of the assembly.

Furthermore, there is no intention to be bound by any expressed or implied theory presented in the preceding technical field, background, brief summary or the following detailed description.

As used herein, the terms "about" or "approximately" apply to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and explain various principles and advantages all in accordance with the present invention.

FIG. 19 depicts a comparison chart of whiskey samples with and without the color and QR-code enabled energy distributing assembly over a 24-hour period;

FIG. 20 depicts a comparison chart of tequila samples with and without the color and QR-code enabled energy distributing assembly over a 24-hour period;

FIG. 21 depicts a comparison chart of whiskey samples with and without the color and QR-code enabled energy distributing assembly over a 5-minute period;

FIG. 22 depicts a comparison chart of tequila samples with and without the color and QR-code enabled energy distributing assembly over a 5-minute period.

DETAILED DESCRIPTION OF THE INVENTION

Figure 1:
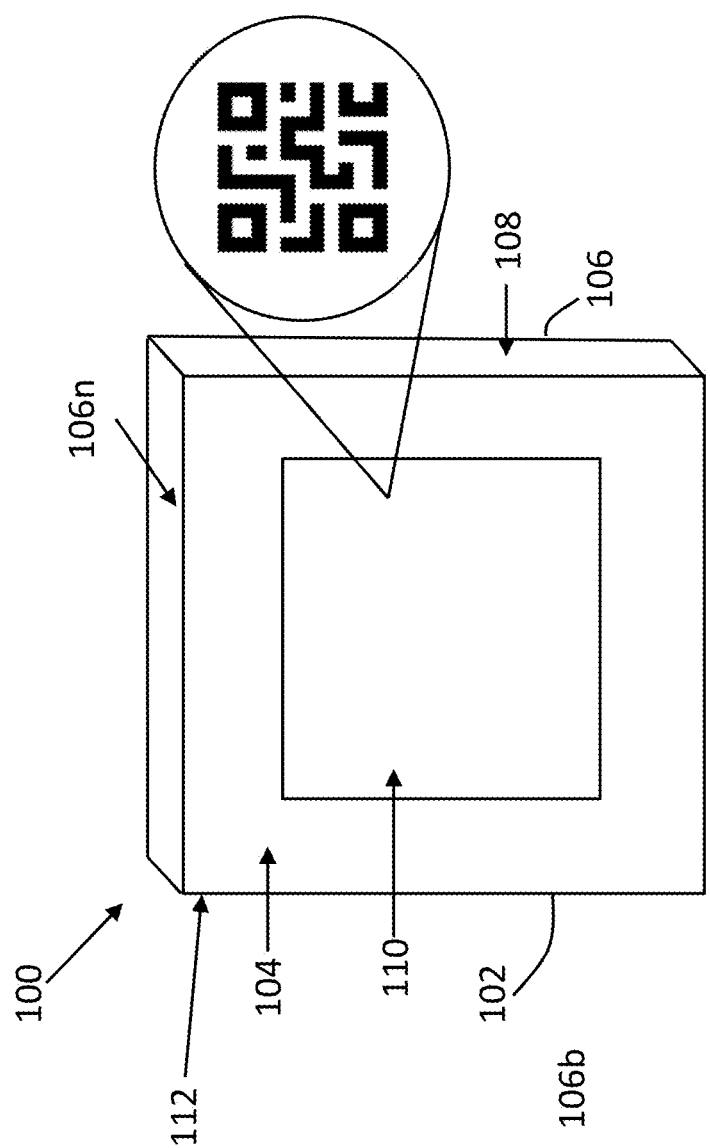
FIG. 1 is an elevational front view of an exemplary color and QR-code enabled energy distributing assembly, in accordance with the present invention.

While the specification concludes with claims defining the features of the invention that are regarded as novel, it is believed that the invention will be better understood from a consideration of the following description in conjunction with the drawing figures, in which like reference numerals are carried forward. It is to be understood that the disclosed embodiments are merely exemplary of the invention, which can be embodied in various forms.

To modify pre-existing chemical structure through wavelength tunneling with the intent of enhancing the taste of liquid consumables for some consumers, the present invention provides a custom color surrounding the QR-code enabled energy distributing assembly is a coaster and label assembly that is operably configured to adjust the light frequency and enhance the taste of the liquid contents placed on top of the coaster or within the beverage container (e.g., glass bottle, metal can, plastic bottle, etc.) on which the label is affixed.

The present invention incorporates a novel custom color surrounding a QR-code enabled energy distributing assembly 100 (hereinafter referred to as "assembly 100" for brevity). Embodiments of the invention provide an assembly 100 comprising a coaster whereupon a cup, mug, thermos, or other liquid storage container can be placed thereon, and the light frequency of the liquid contents therein are adjusted by quantum tunneling to substantially match or reflect the light frequency of the color and QR code disposed on the assembly 100. Alternate embodiments of the invention provide an assembly 100 comprising a label that can be printed on, or affixed to, any beverage container (e.g., glass bottle, metal can, plastic bottle, etc.), whereupon the light frequency of the liquid contents within the beverage container are adjusted by quantum tunneling to substantially match or reflect the light frequency of the color and QR code disposed on the assembly 100.

Figure 6:
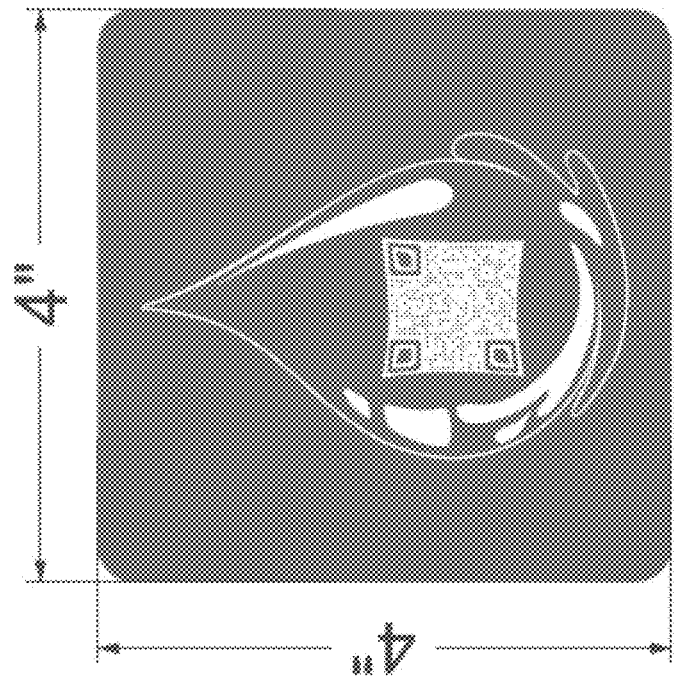
FIGS. 5-6 are top plan views of the color and QR-code enabled energy distributing assemblies with exemplary dimensions, in accordance with another embodiment of the present invention.
Figure 5:
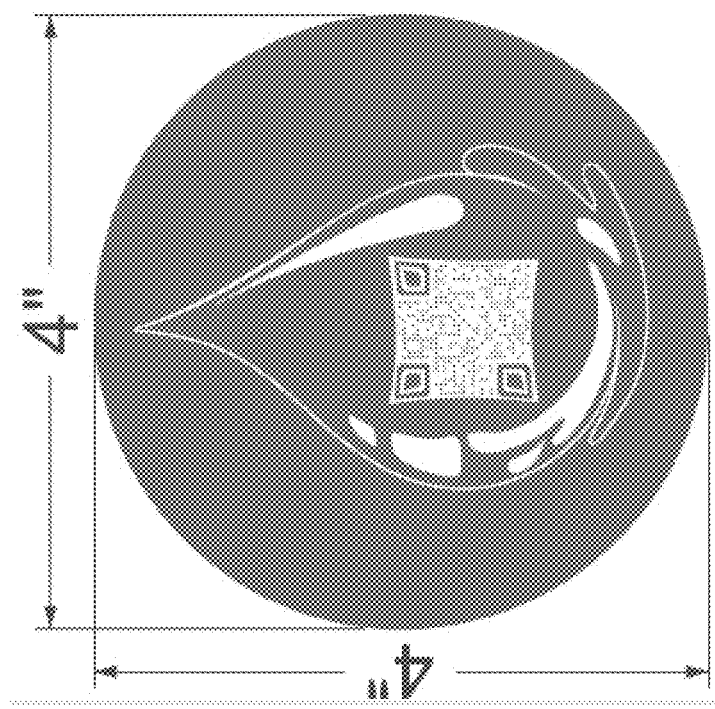

Referring now to FIG. 1, one embodiment of the assembly 100 is depicted in an elevational front view. As shown in FIG. 1, the assembly 100 comprises a coaster body 102 having an upper surface 104 defined by a perimeter edge 112 of the coaster body 102, a lower surface 106 opposing the upper surface 104, and a sidewall 108 separating the upper surface 104 and the lower surface 106. The upper surface 104 is substantially planar, wherein "planar" is defined herein as flat or relating to or in the form of a plane, so as to beneficially provide a flat and even surface upon which a user may selectively place a cup, mug, thermos, or other liquid storage container (also commonly referred to herein as "beverage container"). When the assembly 100 is in use, the lower surface 106 faces outwardly away from the liquid storage container and toward the preferably flat surface on which the assembly 100 is placed. The sidewall 108 separates the upper surface 104 and the lower surface 106 and may range in height depending on the thickness of the coaster body 102. In preferred embodiments, the coaster body 102 is of a square or circular shape (as seen in FIGS. 5-6) to reflect the general shape of the bottom of a glass or cup but in alternate embodiments the coaster body 102 may be of a different shape or outline. In a preferred embodiment, the coaster body 102 is approximately 4 inches by 4 inches, though in alternate embodiments the length and/or width of the coaster body 102 may vary in size between approximately 3 inches and 6 inches to accommodate variously sized cups, glasses, mugs, etc. The coaster body 102 is preferably of a substantially rigid material composition sufficient to structurally support the weight of the liquid storage container placed on the upper surface 104 of the coaster body 102 without substantially deforming. Exemplary material compositions include, without limitation, polypropylene, polysiloxane, metal, pulpboard, cardboard, budgetboard, laminated paper, cork, ceramic, metal, etc. In preferred embodiments, the material composition of the coaster body 102 is of a substantially water-resistant material to properly manage any condensation that runs off the liquid storage container.

The assembly 100 further comprises a color surrounding the QR Code 110 disposed on the coaster body 102 that contains the wavelengths and frequencies referenced above. Short for Quick Response, QR codes are a type of barcode easily readable with digital devices like smartphones. They store information as a series of pixels in a square grid that can be read in two directions—top to bottom and right to left—unlike standard barcodes that can only be read top to bottom. QR codes can store about 7,000 digits or around 4,000 characters, including punctuation and special characters. They can also encode information like phone numbers or internet addresses. The arrangement of each QR code varies depending on the information it contains, and that changes the arrangement of its black modules. The QR code 110 may be either static or dynamic. Static QR codes cannot be modified once they have been created.

Dynamic QR codes allow a user to change and edit the code as many times as needed. In one embodiment, an upper surface area is defined by an outer edge of coaster body and the color is disposed on at least 75% of the upper surface area, wherein the color is preferably disposed on at least 90% of the upper surface area.

In accordance with one embodiment of the present invention, the QR code is embedded into a color, grayscale, or binary image on the body such that the QR code is imperceptible to the naked eye (wherein "imperceptible" is defined as not readily visible or perceivable). QR codes may be embedded into color, grayscale, or binary images and is at least partially formed with the color of the upper surface of the coaster body. The embedding of the QR code into an image or color is designed to be compatible with standard decoding applications and can be applied to any color image with full area coverage. Generally, the embedding of the QR code into an image or color is carried out using halftoning techniques, whereby modified pixels that break and reduce the coarse square structure of the QR code are selected, and a luminance level technique whereby the pixels are transformed in such a way that they are not visible to the naked eye on the color image. In this way, the original QR code is not visible to users though the communicative function of the QR code is still achieved. This feature beneficially improves the aesthetic appearance of the assembly 100 without sacrificing its functional features.

Figure 7:
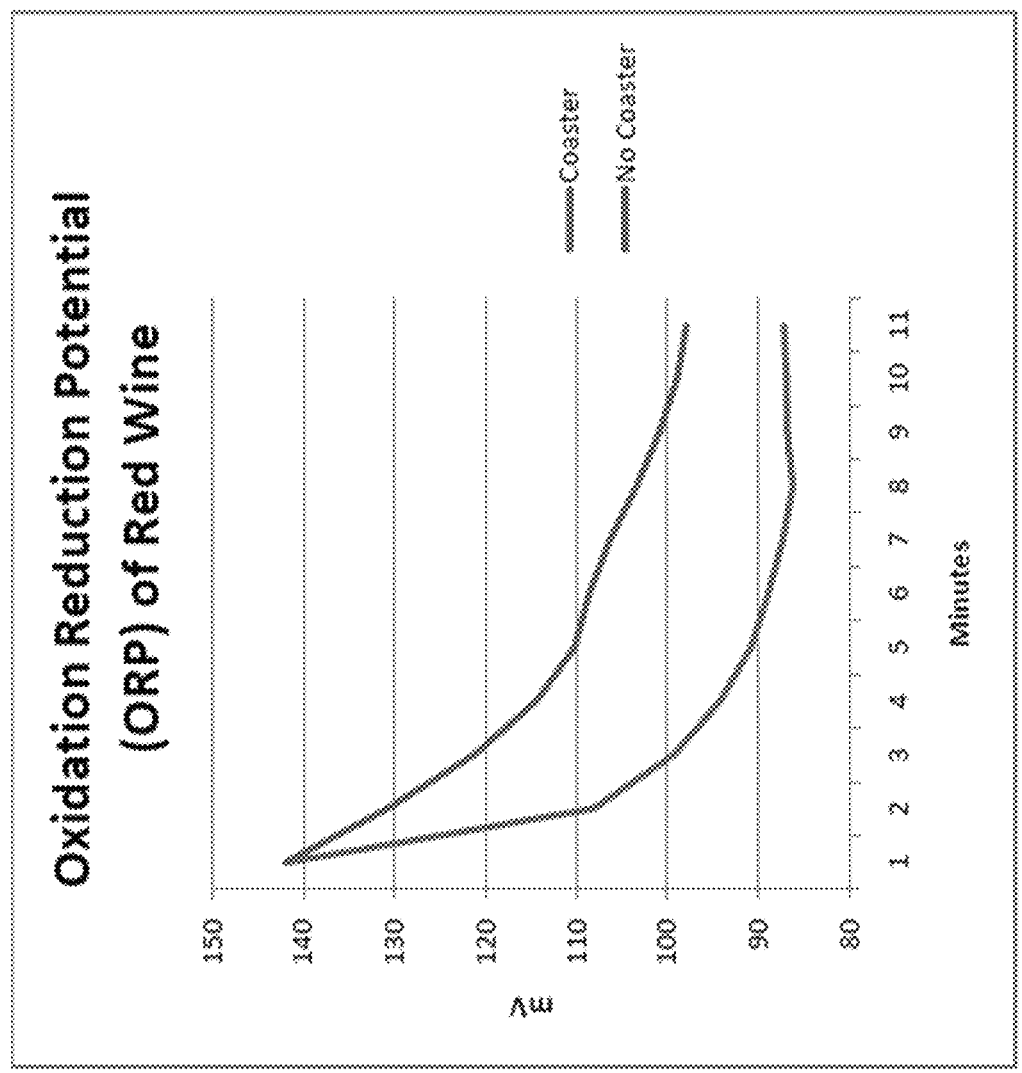
FIG. 7 depicts a graph showing the oxidation reduction potential of a red wine liquid exposed to the color and QR-code enabled energy distributing assembly.

In a preferred embodiment, the color and QR code 110 contains the light frequency of a blue-green hue encoded therein. The blue-green hue (as depicted and exemplified in FIGS. 3-6) carries a light frequency that market research and certified lab testing suggests good tunneling efficiency and chemical modification to the target beverage such as to enhance the taste, texture, acidity, oxygen reduction, and flavor of various liquid consumables for some consumers. FIG. 7 provides evidence of reported changes, notably in red wines i.e., flavor and texture enhancements. The color and QR code 110 may be printed on the label body via various printing techniques, e.g., ink jet, laser printing, thermal printing, flexography, offset lithography, digital press, etc.

With reference to the graph depicted in FIG. 7, said figure depicts the results of a research study demonstrating the efficacy of the claimed invention in terms of generating a lower oxidation reduction potential (ORP), measured in millivolts (mV). The research study utilized a red wine liquid exposed to the assembly 100 having the color surrounding the QR code is depicted over a period of time, wherein a ORP differential between a liquid without a coaster can be seen generated after approximately 1 minute of continuous and proximal exposure of the assembly, namely the color 110 printed on the surface thereon. The results were generated as part of a study examining the effects of using the assembly 100 on alcoholic drinks. As a result of a demonstrably lower ORP, testing among users generated reports of a smoother taste, and more pleasant flavor profile were investigated by a wide net survey approach to the analyses. This initial investigation led to a focus on the changes of ORP as a possible contributing factor to the changes in taste. A bottle of Cabernet was opened and two glasses were poured. The ORP was monitored for 10 minutes. An increase of aeration and oxygen reacting with SO2 could explain the sharp drop in ORP for the sample placed on the assembly 100. As the SO2 and possibly other volatile compounds oxidize or evaporate, the ORP and oxygen concentration rising could be the cause for the increase in ORP as observed at the 8-minute mark. Additional research is currently underway to further define the ORP profile of opened wine and help understand how it affects the taste and aroma of beverages.

The visible spectrum or color spectrum is a subset of the electromagnetic spectrum. The electromagnetic spectrum is a range of frequencies of different energy waves such as gamma rays, X rays, ultraviolet rays, visible light, infrared waves, microwaves and radio waves. The visible light frequencies lie between the frequencies of the ultraviolet rays and infrared waves. As exemplified in Table 1, below, color is determined first by frequency and then by how those frequencies are combined or mixed when they reach the eye. When looking at electromagnetic radiation of a single frequency (i.e., monochromatic light), low frequency radiation is invisible to the human eye. In fact, most humans generally begin to perceive the color red around 400 THz (1 THz=1012 Hz). As the frequency is increased, the perceived color gradually changes from red to orange to yellow to green to blue to violet. Somewhere between 700 THz and 800 THz, the frequency radiation becomes invisible to the human eye again. Because the frequency of a color generally dictates what color a person will perceive, the following frequency and wavelength ranges in terahertz (THz) (1 Hz=1.0E-12 THz) and nanometer (nm) (1 nm=1.0E-9 m), respectively, are associated with each of the generally recognized colors:

TABLE 1

| Color | Frequency (THz) | Wavelength (nm) |
| --- | --- | --- |
| Red | 400-484 | 620-750 |
| Orange | 484-508 | 585-647 |
| Yellow | 508-526 | 570-590 |
| Green | 526-606 | 491-575 |
| Blue | 606-668 | 424-495 |
| Violet | 668-789 | 380-450 |

The exact properties of the taste enhancing color may slightly vary but, in an exemplary embodiment, the taste enhancing color has a wavelength of 490 nm; frequency of approximately 612 THz (i.e., +/−10 THz); wavenumber of 20408 cm$^{-1}$; angular wavenumber of 128228 rad/cm; photon energy of 2.53 eV; photons per joule of energy of $2.47 \times 10^{18}$ photons per joule; momentum of 2.53 eV/c; effective temperature by wavelength of 5914 K; effective temperature by frequency of 5911 K; Rayleigh scattering cross section of $6.86 \times 10^{-27}$ cm$^2$ (standard air in naturally polarized light); mean free path through photon gas at color temperature of $2.22 \times 10^{17}$ m; and mean free path through cosmic background radiation of $4.45 \times 10^{69}$ m. The frequency may vary between approximately 526 terahertz and 668 terahertz and the wavelength may vary between approximately 424 nanometers and 575 nanometers while still substantially retaining the flavor-enhancing properties or abilities. In other embodiments, the frequency ranges from 600-630 THz.

The blue-green hue frequency and wavelength identified above that surrounds and is encoded within the color QR code 110 affects the liquid consumable retained within the liquid storage container that is selectively removably placed on the upper surface 104 of the coaster body 102, in one embodiment, through the phenomenon of quantum tunneling. Quantum tunneling is the quantum mechanics phenomenon whereby wavelengths and frequencies propagate or pass through a potential barrier. Much of its understanding is shaped by the study of the sub-atomic world, which classical mechanics cannot explain. To understand the phenomenon, let us look at matter and waves attempting to travel across a potential barrier. First, matter, can a tennis ball pass through a window without breaking it? Classical mechanics says no 99.9999% of the time. Said another way, a physical particle (tennis ball) or matter cannot pass through a physical barrier (glass). Classical mechanics predicts that the ball will bounce off the window. In quantum mechanics, the study of the sub-atomic or very small, there is another potential outcome. When dealing with sub-atomic quantum particles, they can randomly change from matter to wave function. These sub-atomic particles/wave functions can propagate or cross a potential barrier and tunnel to the other side. The unique color and QR Code wave function and frequencies propagates or passes through the barrier (glass or other container) via quantum tunneling stabilizing and enhancing the taste and texture of the beverage. In one embodiment, the stimulation of oxygen active which forms generation of hydroxyl-radicals (OH*), super-oxide radicals (O2*), and peroxide radicals (OH2*). These are responsible for all oxidation-reduction processes occurring in protein-based and non-protein-based structures, while concurrently activating the metal salt valent state.

Figure 2:
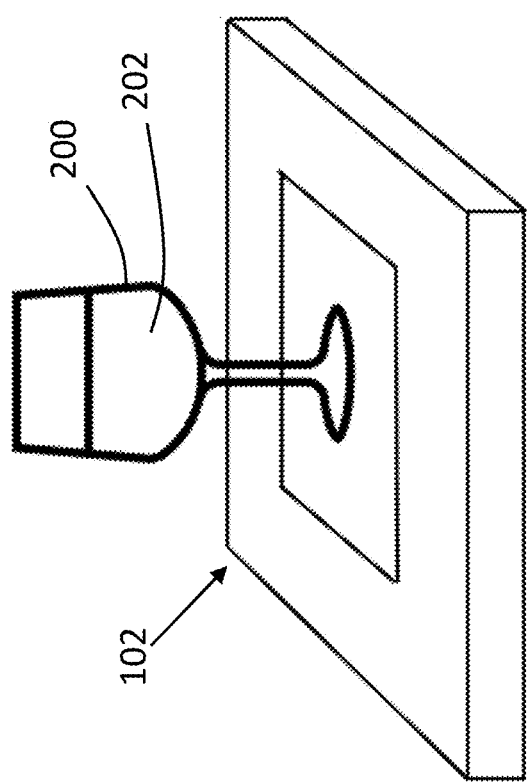
FIG. 2 is a perspective front view of the color and QR-code enabled energy distributing assembly according to FIG. 1 and liquid storage container thereon, in accordance with the present invention.
Figure 3:
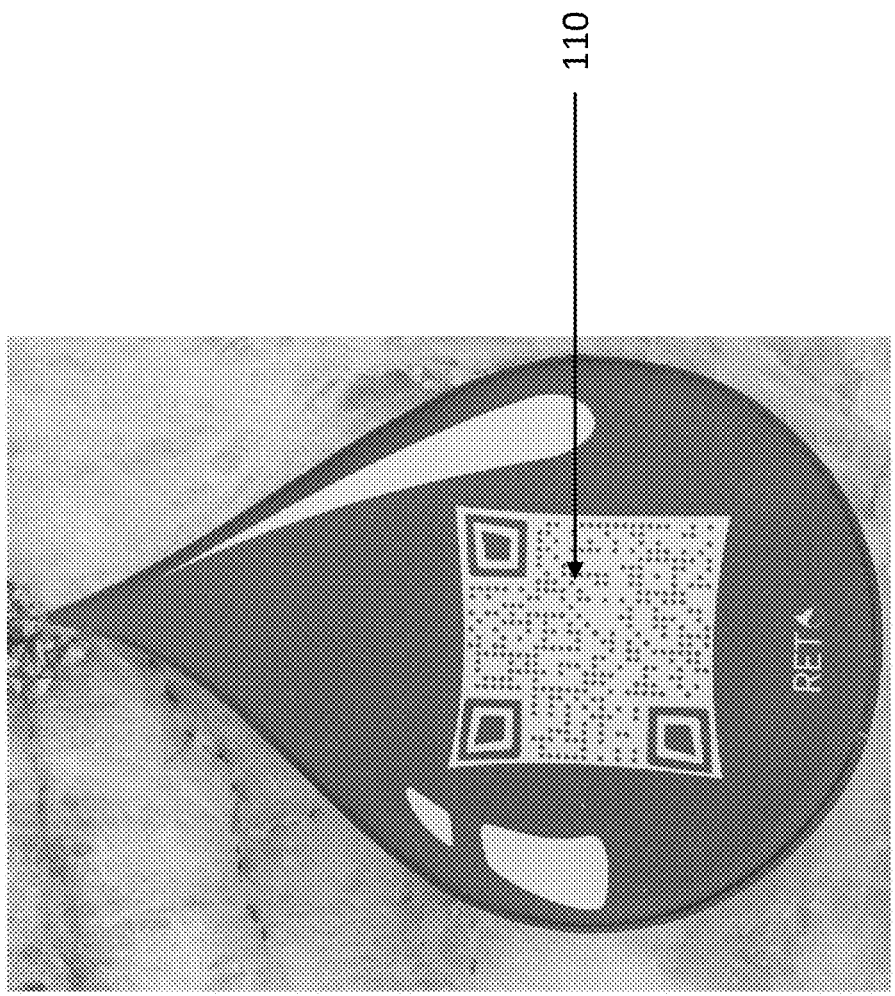
FIG. 3 is a top plan view of the color and QR-code enabled energy distributing assembly, in accordance with one embodiment of the present invention.
Figure 4:
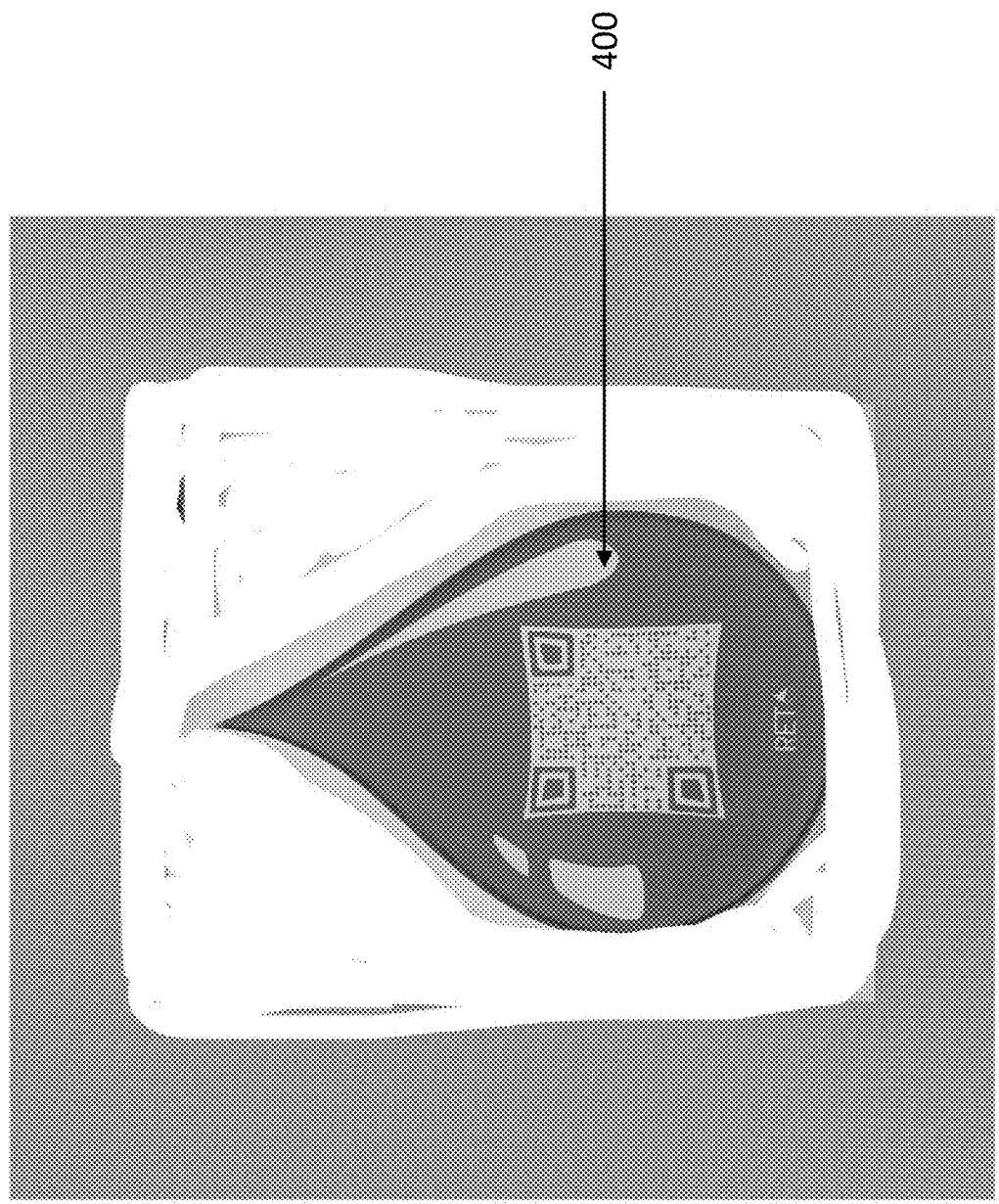
FIG. 4 is a top plan view of the color and QR-code enabled energy distributing assembly, in accordance with another embodiment of the present invention.

In alternate embodiments, the blue-green hue frequency and wavelength encoded in the color and QR code 110 may effect the liquid consumable through another comparable method, technique, or scientific phenomenon while having the same outcome, i.e., effecting the liquid consumable with a frequency and wavelength that may improve the taste, texture, acidity, oxygen reduction potential, and flavor of the liquid consumable for some consumers. An embodiment of the assembly 100 and liquid storage container thereon is depicted in a perspective front view in FIG. 2. The blue-green hue and color QR code 110 is depicted in another embodiment in FIG. 3. Further, another embodiment of the assembly is represented in FIG. 4, wherein a blue-green hue and color QR code 400 is depicted. As the unique blue-green hue effectuates a change in the oxidation/oxygen rate reduction within the liquid (described above) for a set period of time, e.g., 3 mins or longer, to change the taste of the liquid, e.g., wine, beer, whiskey. As exemplified in FIG. 2, a liquid container 200 housing a liquid beverage 202, wherein the color and QR code is disposed proximal to the liquid beverage. The liquid container 200 is handheld, in that it is capable of being held by a user in their hand(s), e.g., a glass, bottle, mug, etc. The liquid container is also at least translucent or preferably transparent to permit light to transfer therethrough. Further, the upper surface area is entirely and adhesively coupled to the outer surface or inner surface of handheld liquid container such that the upper surface is directed and oriented toward the liquid 202 housed in the container 200.

In an alternate embodiment, the assembly 100 may comprise a label, rather than a coaster, having a label body with an upper surface and a lower surface, the label body operably configured to be printed on or affixed or adhered to a beverage container. When the assembly 100 is in use, the lower surface of the label body faces outwardly away from the beverage container and the upper surface of the label body faces toward the beverage container. The upper surface of the label body is designed to depict or display general marketing, advertising, packaging, or other product identification information associated with the beverage product (e.g., the name of the brand or business, product description, nutritional information, etc.). The upper surface of the label body is designed to depict or display the color and QR code 110, which will face, and be in close proximity to, the liquid contents of the beverage container for more lasting and enduring flavor-enhancing effects. Specifically, the color and QR code 110 is disposed proximal to the liquid beverage, wherein "proximal to" is defined as at or within 1 inch of the liquid beverage. This close proximity facilitates more potent, lasting, and/or enduring flavor-enhancing effects.

The label body may be affixed to the beverage container during manufacturing, enabling the entirety of the liquid contents to be taste- and flavor-enhanced from the very beginning of the manufacturing or production process. In preferred embodiments, the label body is of a square or circular shape (as seen in FIGS. 5-6) to reflect the general shape of beverage container labels but in alternate embodiments the label body may be of a different shape or outline. In a preferred embodiment, the label body is approximately 4 inches by 4 inches or of a sufficient width to surround a bottle or container in which it surrounds, though in alternate embodiments the length and/or width of the label body may vary in size between approximately 3 inches and 6 inches to accommodate variously sized beverage containers. The label body is preferably of a substantially flexible and malleable material composition (wherein malleable is defined as capable of being hammered or pressed permanently out of shape without breaking or cracking) so that it may be appropriately secured around, or affixed to, the circular walls of beverage containers. Exemplary material compositions include, without limitation, coated paper, laminated paper, polypropylene, synthetic composite (comprised of a combination of polyolefin and silica filler), polyester/polyethylene terephthalate (PET), vinyl, etc. In preferred embodiments, the material composition of the label body is of a substantially water-resistant material to properly manage any condensation that runs off the liquid storage container. The label body may further comprise an adhesive disposed on the upper surface to which the color and/or QR code is displayed thereon, which is used to permanently or selectively affix the label to the beverage container. The label body may be printed, affixed, adhered, attached, coupled or disposed to or on the beverage container. In some embodiments of the present invention, the QR code is just a few shades lighter in the label technology described above, i.e., approximately less than 40 nm in wavelength that may be measured with, for example, a spectrophotometers.

Figures 8, 9:
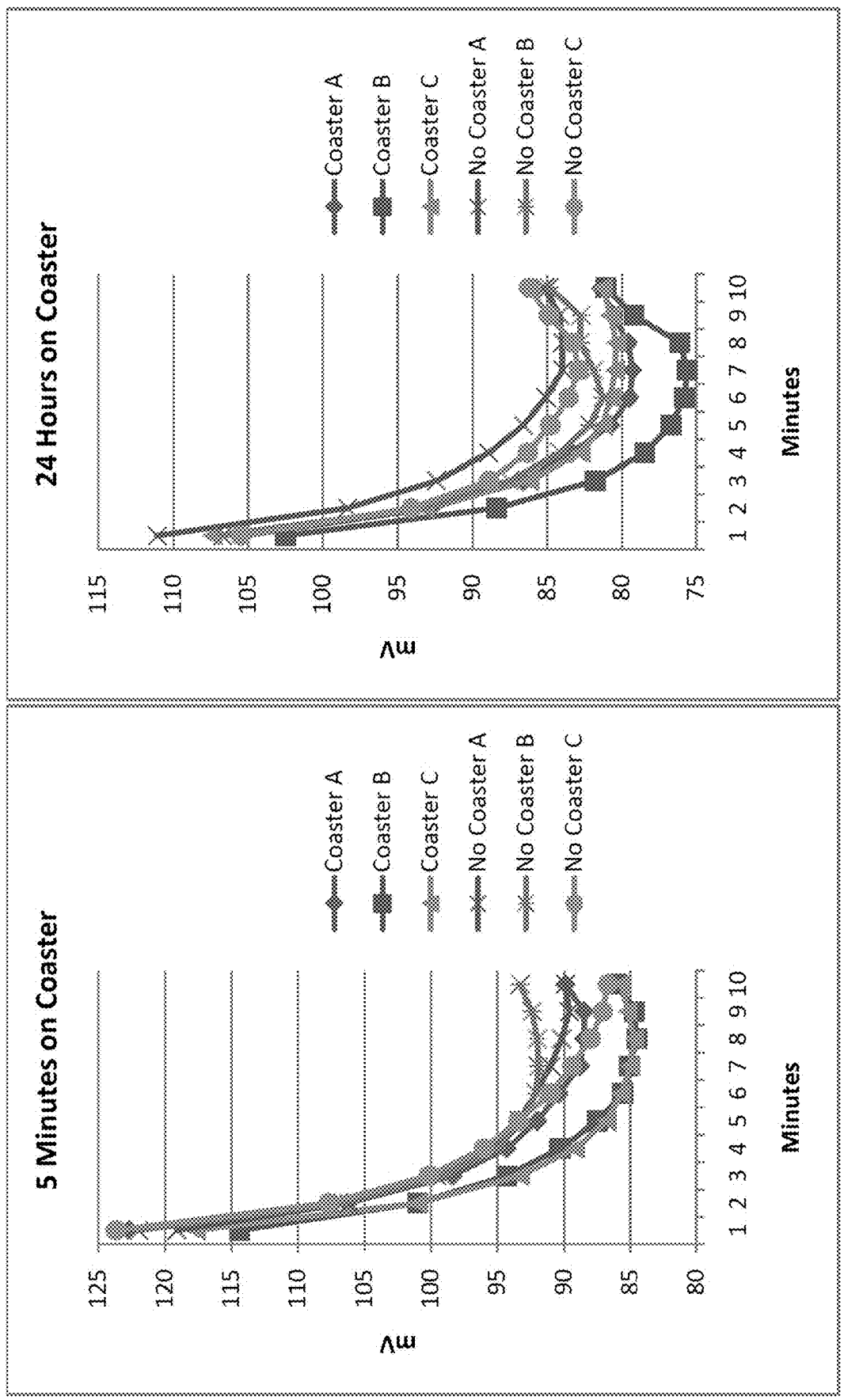
FIGS. 8-9 depict graphs illustrating additional testing results showing oxidation reduction potential of a red wine liquid exposed to the color and QR-code enabled energy distributing assembly.

With reference to FIGS. 8-9, additional graphs are depicted that reflect additional testing results showing oxidation reduction potential of a red wine liquid exposed to the color surrounding the QR-code enabled energy distributing coaster assembly. Specifically, the testing protocol included having twelve single serve bottles of Cabernet Sauvignon wine of the same brand and lot number. Before each experiment, an ORP control standard was analyzed to verify the functionality of the instrument, and stability of the probe readings. Each bottle was placed on the coaster, as discussed above, closed, opened, and then poured into the same glass. ORP was monitored for 10 minutes. Samples were analyzed in a serpentine order, switching back and forth between coaster and no coaster treated samples. In 5 of the 6 treated samples, the overall ORP was significantly lower than the controls. In the 24 hr experiment, all treated samples were much lower in ORP than the controls. Additionally, in the 24 hr experiment, three coasters with 3 bottles were placed in a row on the bench top. Coaster B was in the middle, suggesting the adjacent coasters could have contributed to the lower ORP readings, wherein each of the graphs depict the efficacy of the claimed invention described herein.

Figure 10:
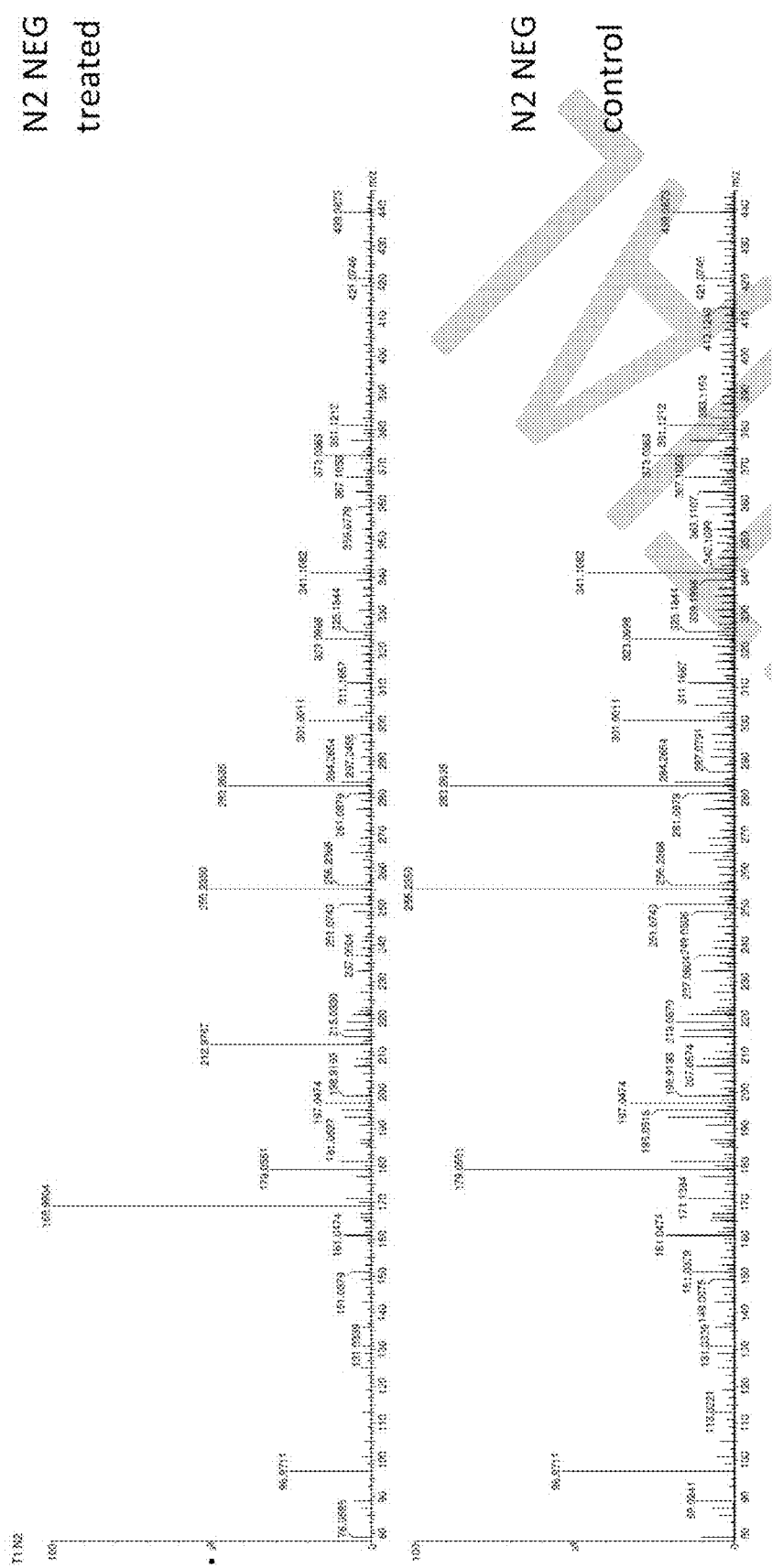
FIG. 10 depicts a comparison of control and treated samples (N2 NEG) in accordance with one embodiment of the present invention.

Additional testing was conducted to determine if there was a difference in the chemical composition of whiskey samples that were treated with the claimed coaster or label assembly using mass spectrometry. Electrospray ionization was employed with a high mass accuracy time of flight detector and direct injection was used to minimize loss of sample. Whiskey and other alcoholic beverages contain volatile substances that inhabit the air space above the liquid. These volatiles are more likely to enter nasal passages and affect odor and flavor senses. Therefore, in addition to measuring the liquid samples, the compounds were also measured in the airspace above the surface of the liquid (headspace). Specifically, it was found that in a comparison of control and treated samples (N2 NEG), there was an appearance of masses at 168.9904 and 212.9789 in the treated samples, but not control sample. This mass was not present in control samples. This difference was observed in all replicates (3 in each group). The data suggested that the presence of oxygen has a significant effect on the chemical composition of the whiskey. For instance, there is virtually no overlap between masses that changed with treatment in O2 and N2 samples. With the headspace samples, an even greater effect of oxygen since would be expected as molecules are dissolved in air and in fact, that is reflected in the chart in FIG. 10.

Additionally testing to demonstrate the efficacy of the claimed invention includes focusing on changes of the fusel oil concentrations in the liquids subject to the coaster or label. In one testing example, three vials of whisky and three vials of gold tequila were placed on a coaster for 24 hours in accordance with the above. Three vials of each spirit were stored under the same conditions and were used as controls. Samples were analyzed in a serpentine order, switching back and forth between coaster and no coaster treated samples. Over a 24-hour period, every average fusel oil value was lower for the treated sample versus the control. Higher fusel oils typically create a harsher tasting experience. The apparent loss or degradation of fusel oils may explain the role the coaster plays in smoothing out the flavor profile. Even over a 5-minute period, every average fusel oil value except one was lower for the treated sample versus the control. With reference to FIGS. 11-22, the mean total fusel oil levels were reduced in both whiskey and tequila samples from vials placed on coasters for either 5 minutes or 24 hours compared to the control samples that were treated the same except for exposure to coasters. This difference is sharpest in whiskey samples from vials that had been on the coaster for 24 hours where the component fusel oils such as active amyl alcohol, iso-butanol, n-propanol and methanol are all significantly lower according to the unpaired, two tailed t-test.

Figure 11:
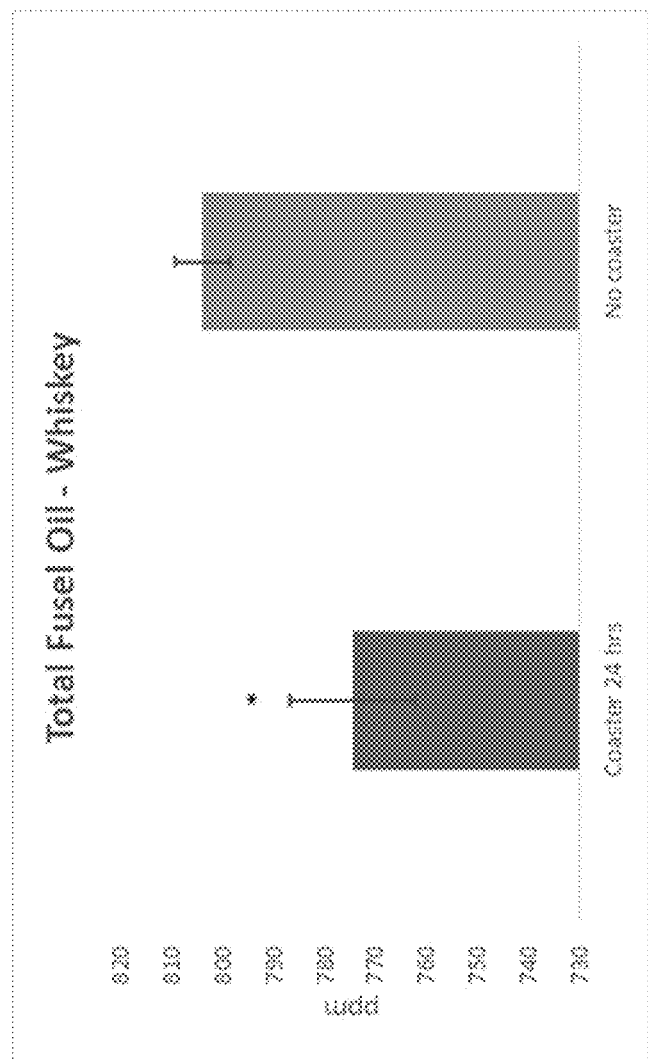
FIG. 11 depicts a comparison of the total fusel oil in whiskey samples with and without the color and QR-code enabled energy distributing assembly, in accordance with one embodiment of the present invention.
Figure 12:
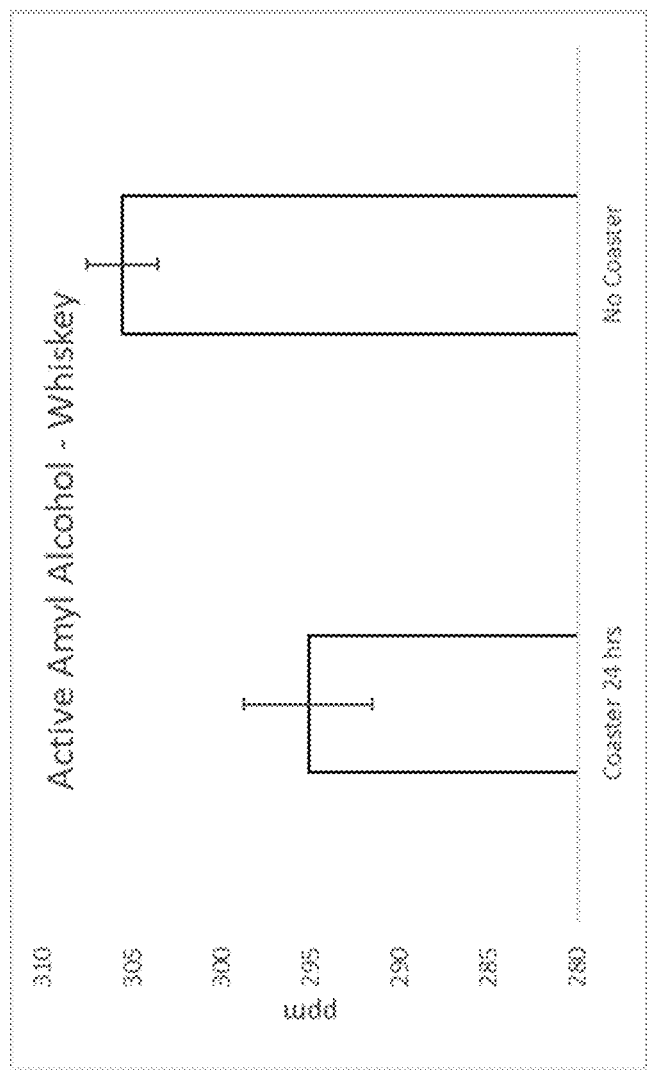
FIG. 12 depicts a comparison of the active amyl alcohol in whiskey samples with and without the color and QR-code enabled energy distributing assembly, in accordance with one embodiment of the present invention.
Figure 13:
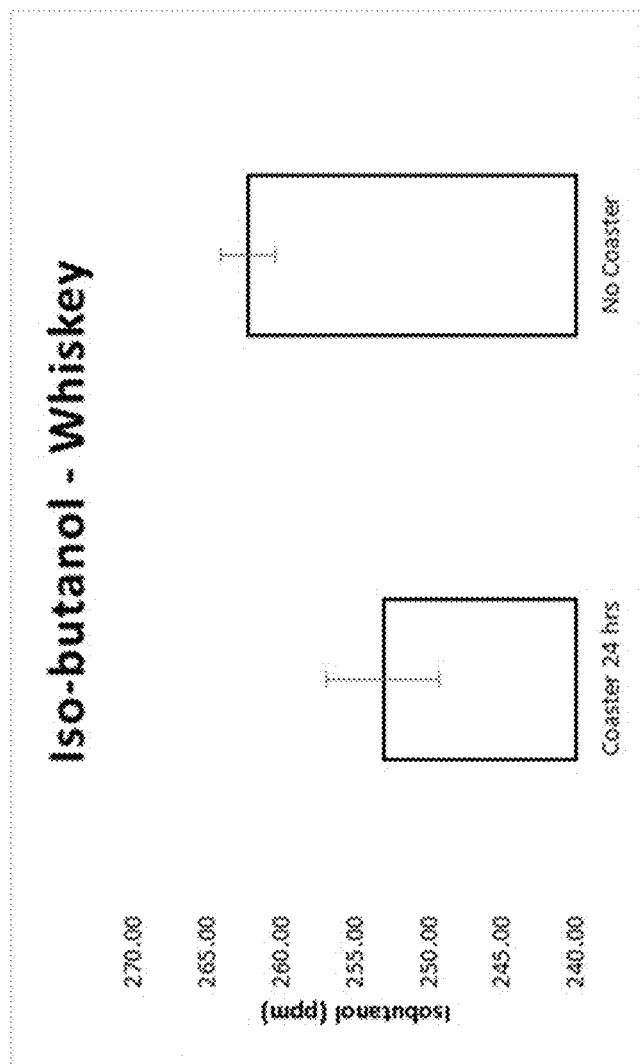
FIG. 13 depicts a comparison of the iso-butanol levels in whiskey samples with and without the color and QR-code enabled energy distributing assembly, in accordance with one embodiment of the present invention.
Figure 14:
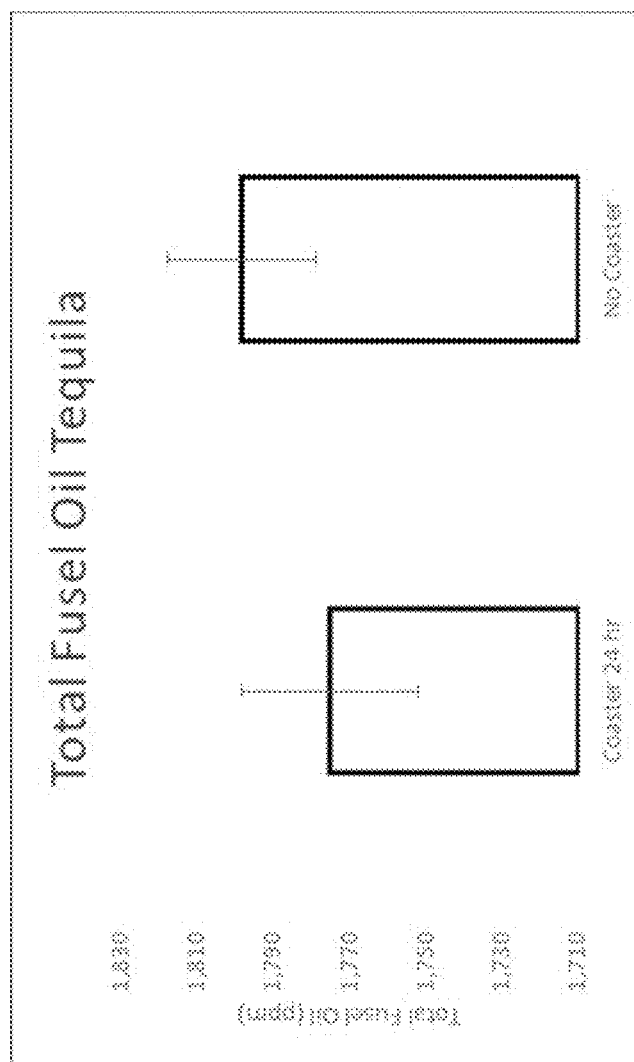
FIG. 14 depicts a comparison of the total fusel oil in tequila samples with and without the color and QR-code enabled energy distributing assembly, in accordance with one embodiment of the present invention.
Figure 15:
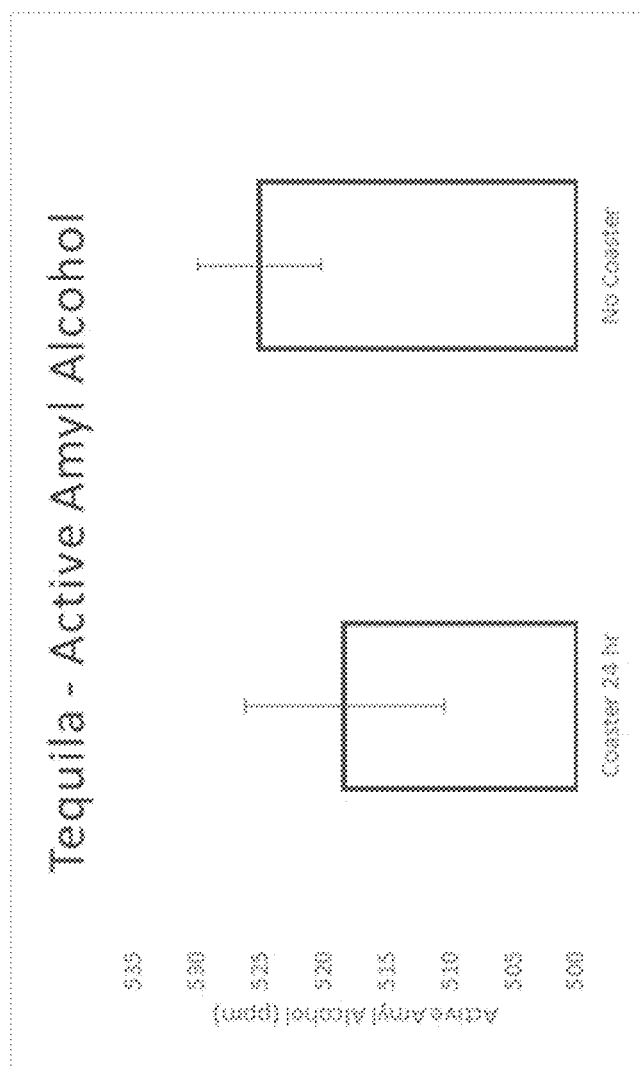
FIG. 15 depicts a comparison of the active amyl alcohol in tequila samples with and without the color and QR-code enabled energy distributing assembly, in accordance with one embodiment of the present invention.
Figure 16:
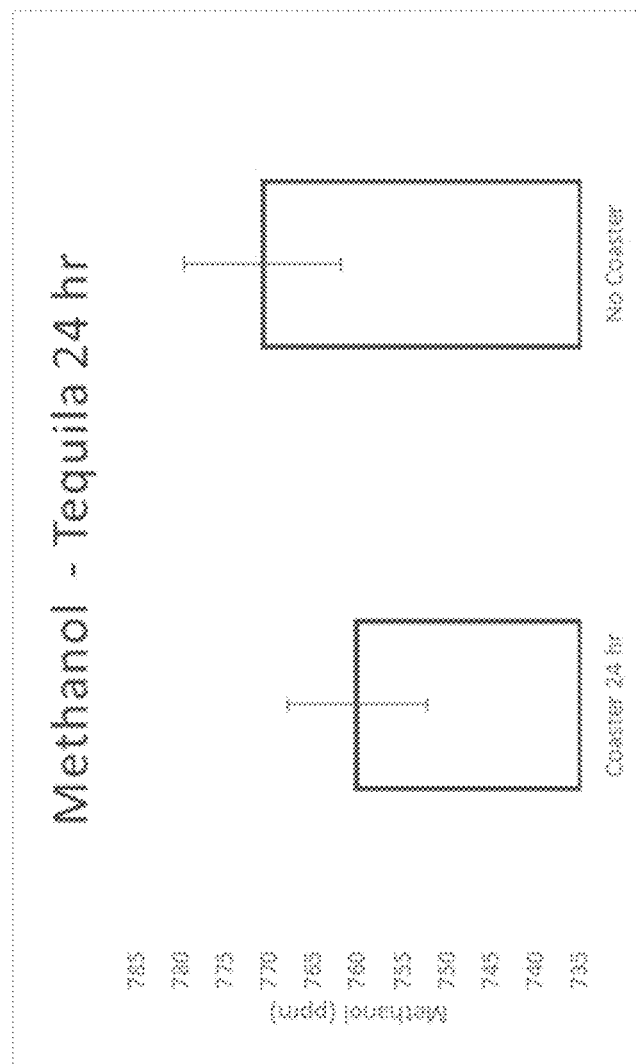
FIG. 16 depicts a comparison of the methanol in tequila samples with and without the color and QR-code enabled energy distributing assembly, in accordance with one embodiment of the present invention.
Figure 17:
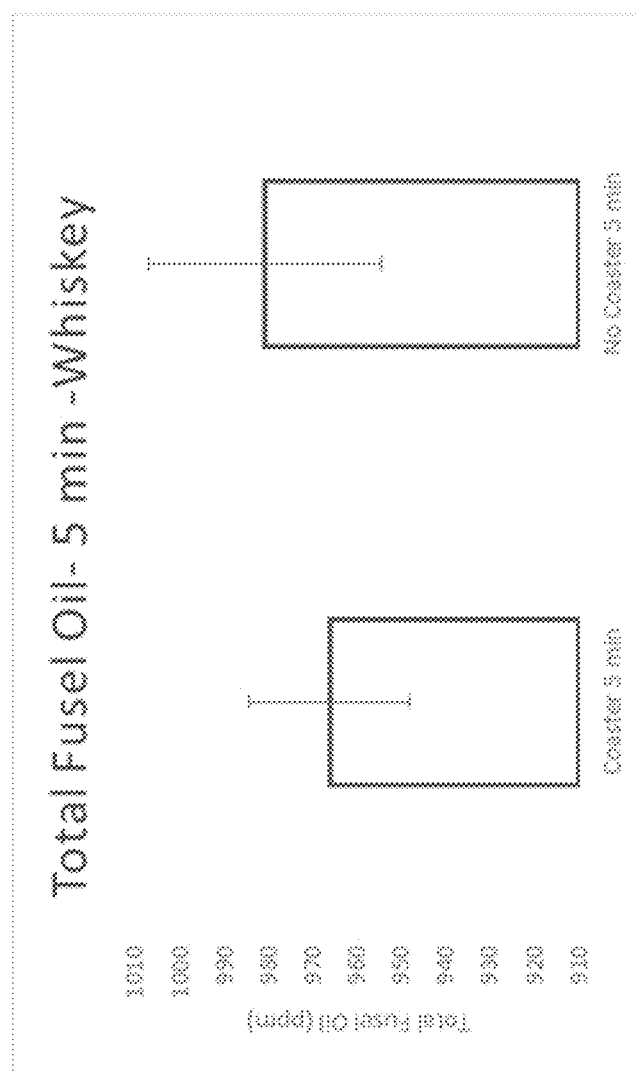
FIG. 17 depicts a comparison of the total fusel oil in whiskey samples with and without the color and QR-code enabled energy distributing assembly over a 5-minute period, in accordance with one embodiment of the present invention.
Figure 18:
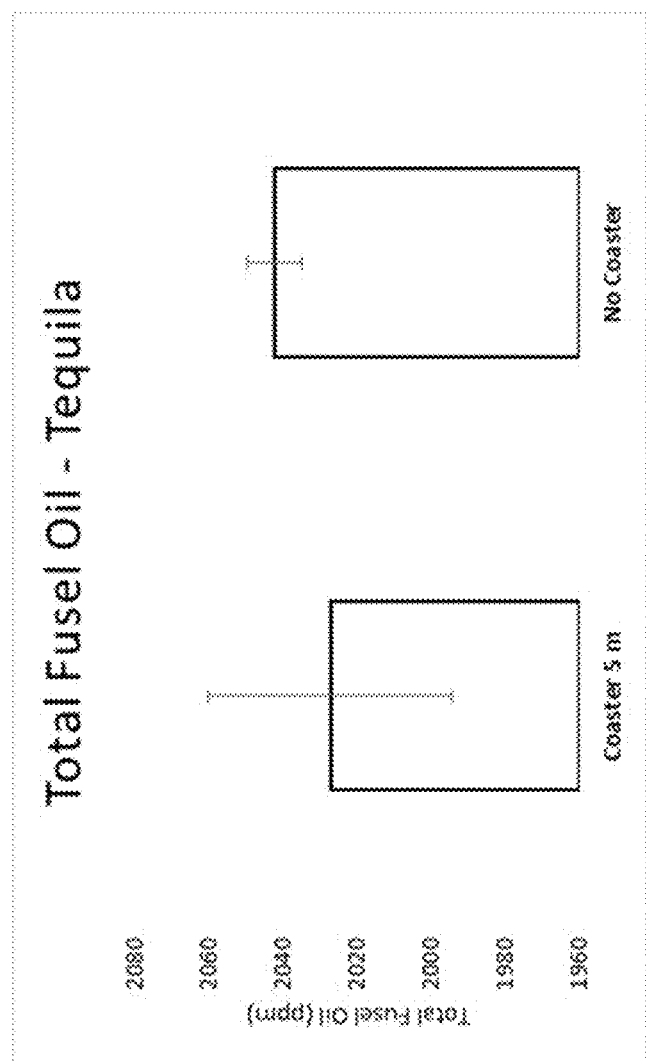
FIG. 18 depicts a comparison of the total fusel oil in tequila samples with and without the color and QR-code enabled energy distributing assembly over a 5-minute period, in accordance with one embodiment of the present invention.
Figure 23:
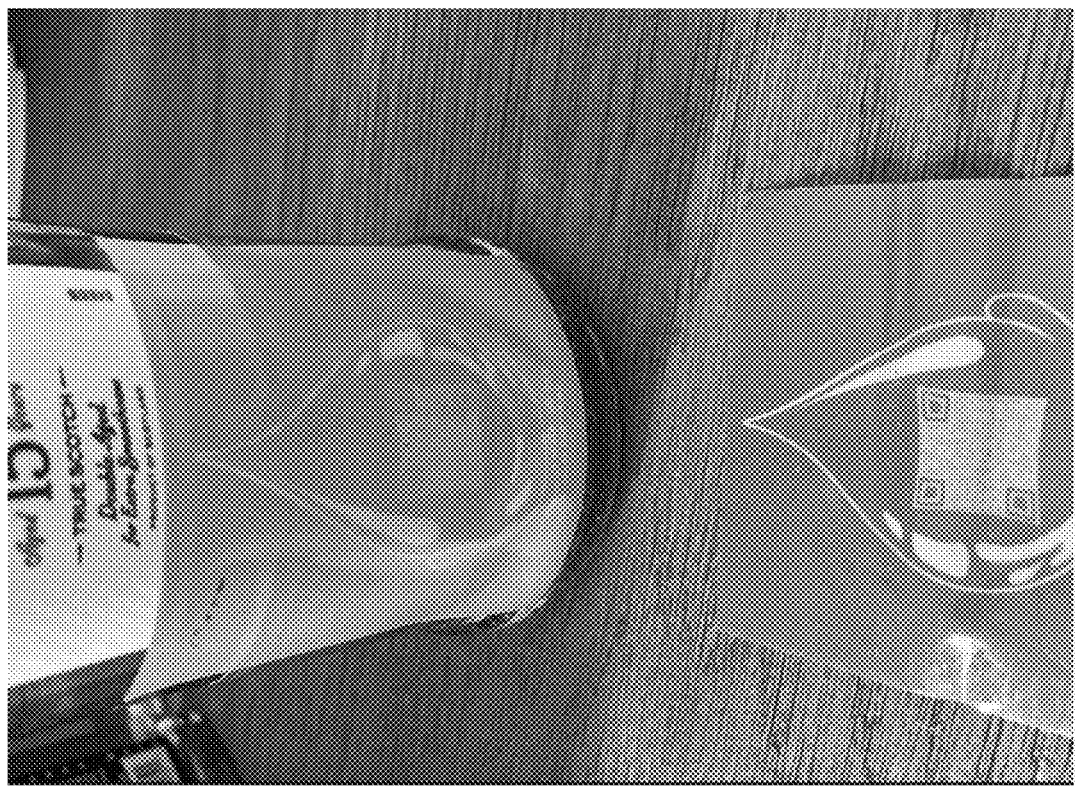
FIG. 23 is a perspective view of the color and QR-code enabled energy distributing assembly, affixed to a liquid storage container in accordance with another embodiment of the present invention.

FIG. 11 depicts a bar graph showing the effect of coaster use on the amount of fusel oil in whiskey samples set on coasters for 24 hours. The data represent the means+/−SD from one experiment in triplicate. Using an unpaired, two-tailed t-test the results are statistically significant: *p=0.019. FIG. 12 depicts a bar graph showing the effect of 24-hour coaster exposure on the amount of active amyl alcohol expressed as parts per million (ppm) in whiskey samples. The data represent means+/−SD from one experiment in triplicate. Using an unpaired, two-tailed t-test the difference in the two means are statistically significant: p=0.0116. FIG. 13 depicts a bar graph showing the effect of 24-hour coaster exposure on the amount of iso-butanol expressed as parts per million (ppm) in whiskey samples. The data represent means+/−SD from one experiment in triplicate. Using an unpaired, two-tailed t-test the difference in the two means are statistically significant: p=0.0197. FIG. 14 depicts a bar graph showing the effect of 24-hour coaster exposure on the amount of total fusel oil expressed as parts per million (ppm) in tequila samples. The data represent means+/−SD from one experiment in triplicate. FIG. 15 depicts a bar graph showing the effect of 24-hour coaster exposure on the amount of active amyl alcohol expressed as parts per million (ppm) in tequila gold samples. The data represent means+/−SD from one experiment in triplicate. FIG. 16 depicts a bar graph showing the effect of 24-hour coaster exposure on the amount of methanol expressed as parts per million (ppm) in tequila gold samples. The data represent means+/−SD from one experiment in triplicate. FIG. 17 depicts a bar graph showing the effect of coaster use on the amount of fusel oil in whiskey samples set on coasters for 5 min. The data represent the means+/−SD from one experiment in triplicate. FIG. 18 depicts a bar graph showing the effect of coaster use on the amount of fusel oil in tequila gold samples set on coasters for 5 min. The data represent the means+/−SD from one experiment in triplicate.

What is claimed:

1. A color and QR-code enabled energy distributing assembly operably configured to enhance a flavor profile of a liquid beverage comprising:
    a coaster body having an upper surface defining an upper surface area, a lower surface opposing the upper surface, a sidewall separating the upper surface and the lower surface, and a color and a QR code printed on the upper surface of the coaster body, wherein ambient light reflecting from the color having a frequency of approximately 612 THz, +/−10 THz, encoded therein to modify the liquid beverage and enhance the flavor profile thereof.

2. The color and QR-code enabled energy distributing assembly according to claim 1, wherein the color is of a blue-green hue and has a wavelength of approximately 490 nanometers encoded therein that corresponds to the blue-green hue.

3. The color and QR-code enabled energy distributing assembly according to claim 1, wherein the upper surface area is defined by an outer edge of the coaster body and the color is disposed on at least 75% of the upper surface area.

4. The color and QR-code enabled energy distributing assembly according to claim 1, wherein the coaster body has dimensions of 4 inches by 4 inches.

5. The color and QR-code enabled energy distributing assembly according to claim 1, wherein the QR code is embedded into one of a color, grayscale, or binary image on the coaster body and is partially formed with the color of the upper surface of the coaster body.

6. The color and QR-code enabled energy distributing assembly according to claim 1, further comprising:
    a liquid container housing a liquid beverage, wherein the color and QR code is disposed proximal to the liquid beverage.

7. A color and QR-code enabled energy distributing assembly operably configured to enhance a flavor profile of a liquid beverage and comprising:
    a handheld liquid container housing a liquid beverage; and
    a label body having an upper surface defining an upper surface area entirely and adhesively coupled to the handheld liquid container, a lower surface opposing the upper surface, and with a color printed on the upper surface of the label body and disposed proximal to the liquid beverage, wherein ambient light reflecting from the color having a frequency of approximately 612 THz, +/−10 THz, encoded therein to modify the liquid beverage and enhance the flavor profile thereof.

8. The color QR-code enabled energy distributing assembly according to claim 7, wherein the color is of a blue-green hue and has a wavelength of approximately 490 nanometers encoded therein that corresponds to the blue-green hue.

9. The color QR-code enabled energy distributing assembly according to claim 7, wherein the label body has dimensions of 4 inches by 4 inches.

10. The color QR-code enabled energy distributing assembly according to claim 7, further comprising a QR code disposed on the upper surfaces of the label body and is embedded into a color, grayscale, or binary image on the label body.

11. The color QR-code enabled energy distributing assembly according to claim 10, wherein the color and QR code is disposed proximal to the liquid beverage.

12. In combination with a beverage container having a liquid beverage therein, a color and QR-code enabled energy distributing assembly operably configured to enhance a flavor profile of a liquid beverage and comprising:
  a body having an upper surface, a lower surface opposing the upper surface, and a color and a QR code printed on the body, wherein ambient light reflecting from the color having a frequency of approximately 612 THz, +/−10 THz, encoded therein, corresponding to the blue-green hue, and disposed proximal to the liquid beverage to modify the liquid beverage and enhance the flavor profile thereof.

13. The color QR-code enabled energy distributing assembly according to claim 12, wherein the QR code is embedded into a color, grayscale, or binary image on the body.

* * * * *